United States Patent [19]

Barmatz et al.

[11] Patent Number: 4,800,756

[45] Date of Patent: Jan. 31, 1989

[54] ACOUSTIC CONTROLLED ROTATION AND ORIENTATION

[75] Inventors: Martin B. Barmatz, Glendale; James L. Allen, La Crescenta, both of Calif.

[73] Assignee: The United States of America as represented by the Administrator, National Aeronautics and Space Administration, Washington, D.C.

[21] Appl. No.: 924,297

[22] Filed: Oct. 29, 1986

[51] Int. Cl.[4] ........................ G10K 15/00; G01B 17/00

[52] U.S. Cl. .......................................... 73/505; 73/571

[58] Field of Search ...................... 73/505, 571, 865.8, 73/584; 181/0.5

[56] References Cited

U.S. PATENT DOCUMENTS

| | | | |
|---|---|---|---|
| 3,882,732 | 5/1975 | Wang et al. | 73/505 |
| 4,139,806 | 2/1979 | Kanber et al. | 318/116 |
| 4,393,706 | 7/1983 | Barmatz | 73/505 |
| 4,420,977 | 12/1983 | Elleman et al. | 73/505 |
| 4,475,921 | 10/1984 | Barmatz | 23/313 R |
| 4,573,356 | 3/1986 | Barmatz et al. | 73/505 |
| 4,716,764 | 1/1988 | Felix | 73/571 |

*Primary Examiner*—John Chapman

*Attorney, Agent, or Firm*—Paul F. McCaul; John R. Manning; Thomas H. Jones

[57] ABSTRACT

Acoustic energy is applied to a pair of locations spaced about a chamber, to control rotation of an object levitated in the chamber. Two acoustic transducers applying energy of a single acoustic mode, one at each location, can (one or both) serve to levitate the object in three dimensions as well as control its rotation. Slow rotation is achieved by initially establishing a large phase difference and/or pressure ratio of the acoustic waves, which is sufficient to turn the object by more than 45°, which is immediately followed by reducing the phase difference and/or pressure ratio to maintain slow rotation. A small phase difference and/or pressure ratio enables control of the angular orientation of the object without rotating it. The sphericity of an object can be measured by its response to the acoustic energy.

10 Claims, 3 Drawing Sheets

FIG.1
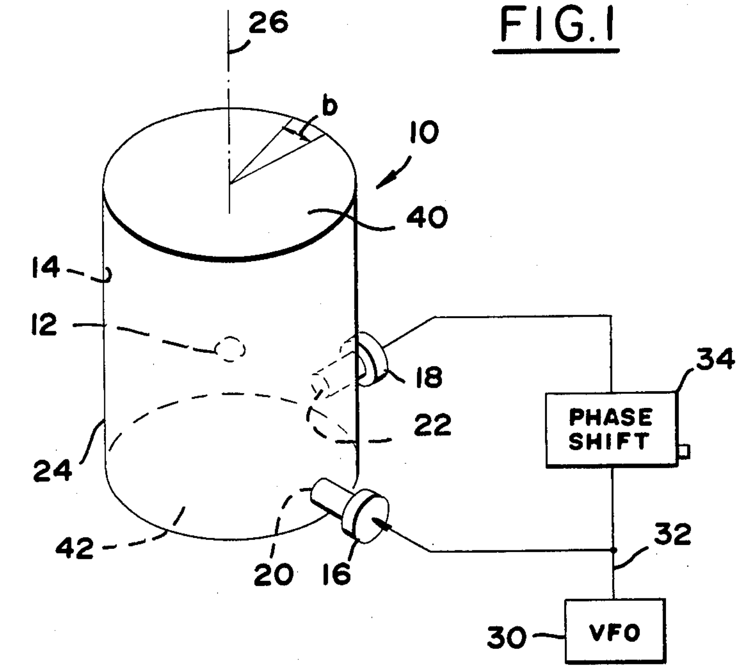
FIG.2
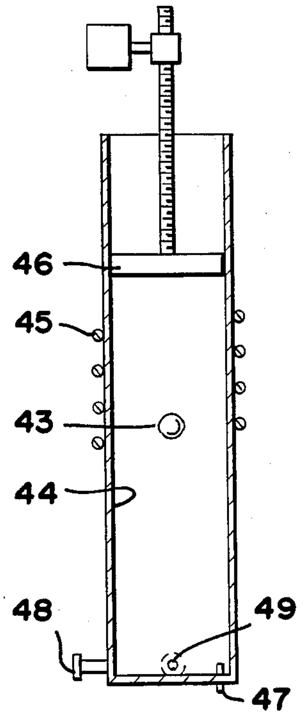
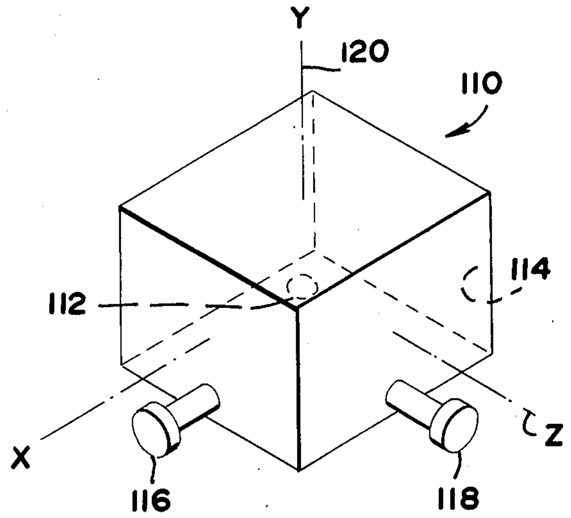
FIG.3

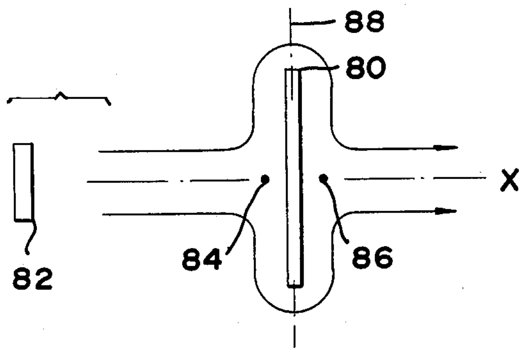
FIG. 4
FIG. 5
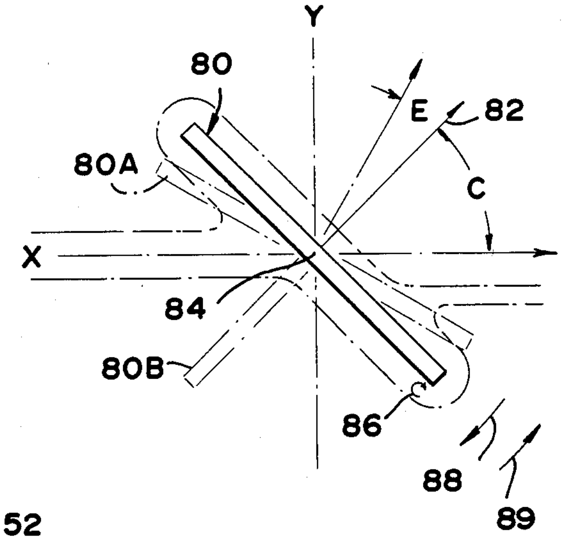
FIG. 8
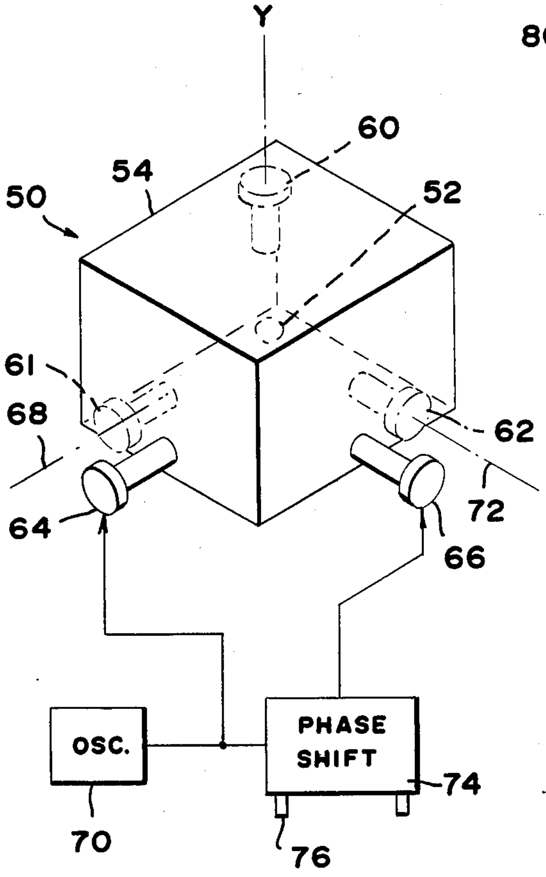
FIG. 6
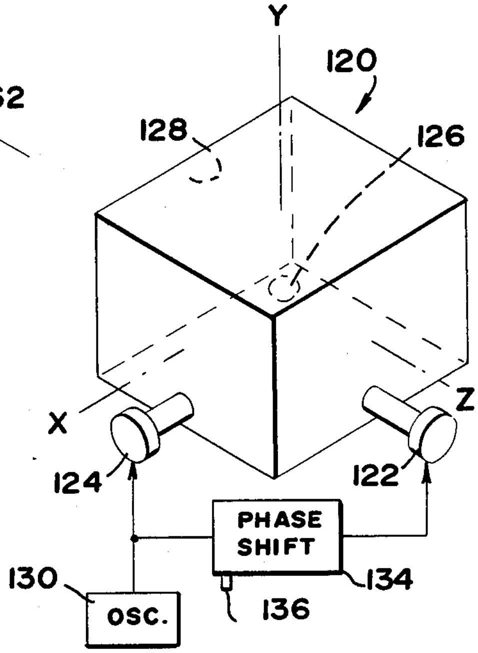

ACOUSTIC CONTROLLED ROTATION AND ORIENTATION

ORIGIN OF THE INVENTION

The invention described herein was made in the performance of work under a NASA contract, and is subject to the provisions of Public Law 96-517 (35 USC 202) in which the Contractor has elected not to retain title.

BACKGROUND OF THE INVENTION

An object can be held in a chamber, away from the walls of the chamber, by acoustic energy, electrostatic fields, and the like. It is known that such a levitated object can be made to rotate by applying acoustic energy resonant to the chamber at two locations spaced 90° about the chamber, and with the acoustic energy at the two locations being of the same frequency but 90° out of phase. In systems where one or more transducers have been used to levitate an object in three dimensions within a chamber, the addition of a pair of transducers to also rotate the object, would add to the number of transducers and require adjusting the frequency of all transducers as conditions change, such as a change in the temperature of gas in the chamber. A system which minimized the number of transducers required to simultaneously levitate an object and control its rotation would be of considerable value.

In prior art techniques for rotating an object, it has been easy to rapidly rotate an object, but more difficult to slowly rotate it or control its position without continuous rotation of the object. A method and apparatus which enabled controlled slow rotation of an object as well as angular positioning of the object, would also be of considerable value.

SUMMARY OF THE INVENTION

In accordance with one embodiment of the present invention, an apparatus and method are provided for closely controlling rotation of a levitated object, which is simple and enables close rotational control. An object can be levitated in a chamber and its rotation controlled, by applying acoustic energy to only two locations spaced about the chamber, with the acoustic energy being out of phase at the two locations to control rotation, and with the acoustic energy being of a single levitation mode. For a cylinder, the acoustic energy is of a 10 n cylindrical mode, where n is an integer of at least 2. For a chamber of rectangular cross section, the acoustic energy is of a n21 rectangular mode, where n is an integer of at least 2.

Slow rotation of an object in a chamber is achieved by applying resonant acoustic energy to two locations spaced about the chamber, of the same wavelength but out of phase, with the phase difference initially being great enough to rotate the object past a "critical" angle away from its equilibrium angular position. After the object has rotated past the critical angle, the phase difference is reduced to maintain slow rotation. The angular orientation of a levitated object is controlled using the same apparatus as for slow rotation, but by maintaining a phase difference between the acoustic energy at the two locations, which is less than the "critical" amount, with the phase difference chosen to obtain a selected object orientation. The sphericity of the object can be determined by its rotational response to a given phase angle difference for the same apparatus that is used for slow rotation.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective view of an apparatus for controlling an object in a cylindrical chamber.

FIG. 2 is a sectional view of an apparatus modified from that of FIG. 1.

FIG. 3 is a perspective view of an apparatus for controlling an object in a chamber of rectangular cross section.

FIG. 4 is a representational view of an object, showing forces thereon when acoustic energy is applied along only one direction thereon.

FIG. 5 is a view of the object of FIG. 4, showing the orientation of the object when acoustic energy is applied along two perpendicular directions to the object.

FIG. 6 is a perspective view of an apparatus for controlling the rotation of a levitated object.

FIG. 8 is a perspective view of apparatus for controlling the angular orientation of an object.

DESCRIPTION OF THE PREFERRED EMBODIMENTS

Figure 7:
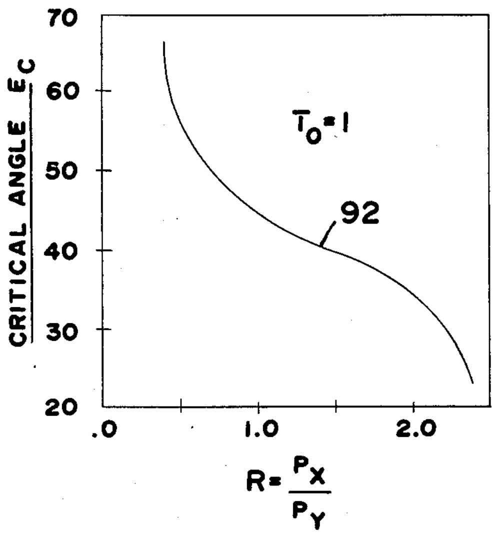
FIG. 7 is a representative graph showing variation in the critical angle of rotation of a particularly shaped object away from its equilibrium position, for different ratios of acoustic pressure applied at two perpendicular locations to the object.

FIG. 1 illustrates an apparatus 10 which can levitate an object 12 and control its rotation about an axis 26 within a cylindrical chamber 14 filled with gas (e.g., air), using only two transducers 16, 18. The two transducers 16, 18 are coupled to a pair of locations 20, 22 spaced about the walls 24 of the chamber, and preferably spaced about 90° about the axis 26 of the chamber and lying near one end of the chamber. The transducers are of a type that is electrically energized. A variable frequency oscillator 30 generates electrical currents of a frequency whose acoustic wavelength is resonant to the chamber. The output 32 of the oscillator is delivered to one of the transducers 16 to drive it. The output 32 is also delivered through a phase shifter 34 which shifts the phase by a controlled amount up to +90°, and delivers the output to the other transducer 18. For acoustic wavelengths of proper modes, the output of the two transducers can serve to acoustically levitate the object and to control its orientation and rotation about the axis 26.

A single acoustic transducer can levitate an object within a cylindrical chamber using any of many different resonant modes. As discussed in U.S. Pat. No. 4,573,356, one mode has a wavelength of $L_{01n}$. While this mode can levitate an object, it does not produce any variation in pressure with angle b about the axis of the cylinder, and applying this mode to the two transducers will not enable control of rotation of the object. Another single mode which can be used to levitate an object has a wavelength $L_{1on}$ given by the following equation:

$$L_{lon} = \frac{2a}{[0.344 + n^2(a/l)^2]^{\frac{1}{2}}}(1 + 1.29\ Vs/Vc) \quad \text{Eq. 1}$$

where n is a positive integer equal to 2 or more, a is the radius of the cylinder, 1 is the length of the cylinder, $V_s$ is the volume of the sample or object being levitated, and $V_c$ is the volume of the chamber. The above equation is relatively accurate for objects having a volume of up to about 20% of the chamber volume.

The application of acoustic energy of the wavelength given by equation 1 to a cylindrical chamber containing an object, results in levitation of the object and control of rotation of the object. As is described in the earlier mentioned U.S. Pat. No. 4,573,356, the levitation positions depend upon the number n, with n=2 resulting in a single levitation position along the axis halfway between the opposite ends 40, 42 of the cylinder, and with n equal to 3 or more resulting in levitation at any of two or more positions.

If it is desired to rotate the object, the circuit 34 is adjusted to provide a phase difference between the outputs of the two transducers. Maximum rotational torque is obtained by driving the two transducers at a 90° phase difference, while progressively less torque is obtained by driving the transducers at progressively lower phase differences down to zero degrees. It may be noted that the output of the two transducers does not have to be equal, as one transducer 16 may be driven at a high enough amplitude to levitate the object, and the other 18 may be driven with sufficient amplitude, preferably at least 0.4 of the intensity of the other transducer, to cause rotation of the object.

One advantage of using only a single frequency for levitation rotation control is ease in following changes in the chamber. FIG. 2 shows an object 43 which can be raised in a cylindrical chamber 44 to a location beside a heating coil 45 to melt the object, and then lowered to solidify it. This is accomplished by raising and lowering a piston 46 that forms one end of the chamber. The resonant frequency changes as the temperature of gas in the chamber changes, and as the height of the chamber changes. A single microphone 47 can be used to track changes in resonant frequency of a single levitation mode, to vary the frequency at which transducers 48, 49 are driven, so the transducers can continue to levitate and control rotation of the object.

While it is often useful to be able to use only two transducers to both levitate and rotate an object, it is possible to use one means to levitate an object, and a pair of transducers spaced about a chamber and used solely to control rotation of the object. FIG. 6 illustrates such an apparatus 50 in which the object 52 is levitated within a chamber 54 of rectangular cross section by three transducers indicated at 60–62, while the object is controlled in rotation by a pair of additional transducers 64, 66 which are not used to levitate the object. One circuit 70 drives one transducer 64 at a frequency whose wavelength is resonant to the length of the chamber as measured along an axis 68, while the other transducer 66 is driven by another circuit 74 at the same frequency, which is also resonant to the width of the chamber as measured along another axis 70. The phase difference between the outputs of circuits 70, 74 is adjustable by controlling a phase adjust control 76.

If an attempt is made to slowly rotate the object 52 by starting with a zero phase difference between the outputs of the transducers 64, 66 and slowly increasing the phase difference, it would be found that the object will not rotate until a certain phase difference is attained. Once the object starts rotating, it will rotate rapidly. Applicant has found that the object will not begin continuous rotation until a certain phase difference is applied, and then the object will begin rotating rapidly.

A description of the torques resulting from applying out-of-phase acoustic energy to a levitated object, will aid in understanding rotation. FIG. 4 illustrates an object 80 located in an acoustic field created by a transducer 82 which is generating waves moving along an X axis of a chamber. The particular object 80 is a disk and FIG. 4 shows the edge of the disk. These waves create stagnation points where there is no net flow at 84 and 86. At all other points on the disc surface there is gas flow which leads to a pressure drop. The orientation shown in FIG. 4 is the equilibrium orientation, to which it is urged.

FIG. 5 illustrates a situation where acoustic waves are passing along two perpendicular directions X and Y across the object 80, with both acoustic waves being in phase. The result is that the object achieves an equilibrium position where an imaginary line 82 perpendicular to a face of a disk-like object is at an equilibrium angle c from the X direction. If acoustic pressures in the two directions are equal, the angle c is 45°. A similar phenomenon occurs for objects of other nonspherical shapes. When the acoustic energy in the two directions Y and X are out of phase, the object turns either clockwise or counterclockwise about the Z axis 84, depending upon which direction leads in phase. When the object turns to a position away from its equilibrium position, the angle of turning is indicated by the angle E. When the object at 80A has been rotated by an angle E away from its equilibrium position which it assumes when both acoustic waves are in phase, there are two torques acting on the object, which are in balance. A first torque is a "viscous torque," caused by molecules of gas surrounding the object, which turn in ellipses (circles at a 90° phase difference), indicated at 86, and which urge the object to turn in one direction 88. A second torque is an "airflow" torque produced on the object by the flow of gas thereacross caused by the acoustic waves, which produce stagnation and vacuum urging the object at 80A to rotate back towards the equilibrium position, in a direction 90 opposite to the viscous torque. The orientation of the object at 80A at the angle E away from its equilibrium orientation is the position where the viscous torque and the airflow torque balance. As the phase difference between the acoustic waves increases and the angle E increases, a critical angle $E_c$ is reached which corresponds to a maximum airflow torque. Any further increase in the phase difference will lead to a net torque that rotates the object. If a phase difference required to exceed the critical angle is maintained, the object will keep turning and at an increasing speed, until limited by drag.

If it is desired to rotate an object at a relatively slow rate, then a large initial phase difference is applied until the object has rotated past the critical angle $E_c$. Then the phase difference is reduced to a lower level to establish a relatively low rotation rate. It is often desirable to reduce the phase difference immediately after the object has begun rotating, to avoid having the object initially rotate at a very rapid rate where, for example, a liquid object might break apart. In such a case it is generally desirable to reduce the phase difference before the object has rotated a plurality of times (2 or more times) when it may have achieved most of its final rotational rate if the original phase difference were maintained.

FIG. 7 is a curve 92 showing the variation in critical angle $E_c$ with the ratio R of acoustic pressure in the X and Y directions for an oval object. When the acoustic pressures are equal in both directions, so R equals 1, the critical angle at which continuous rotation begins is at 45°. The critical angle remains relatively constant at about 45° until the ratio R deviates considerably from 1. At a ratio of about 0.4, or its inverse which is about 2.4, the critical angle increases or decreases from 45° by 22.5°. If the ratio is less than about 0.4 or greater than about 2.4, the object cannot be continuously rotated even for a maximum phase difference of 90°. Thus, for most useful ratios of acoustic pressures in two perpendicular directions (between about 0.6 and its inverse), the critical angle is about 45° (between about 35° and 55°). It may be noted that the critical angle is dependent upon the shape of the object. The phase difference between the acoustic energies required to reach the critical angle depends greatly upon the sphericity of the object. An almost spherical object will reach the critical angle with a low phase difference of a few degrees, while a very nonspherical object requires a phase difference approaching 90°.

Figure 7A:
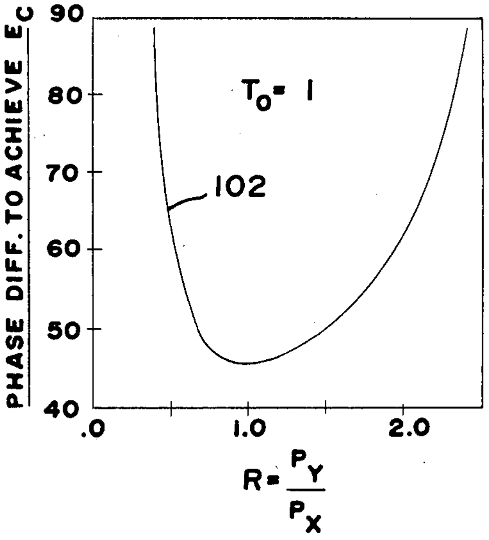
FIG. 7A is a representative graph showing variation of phase difference to reach the critical angle, with ratio of acoustic pressures, for the same object as in FIG. 7.
Figure 9:
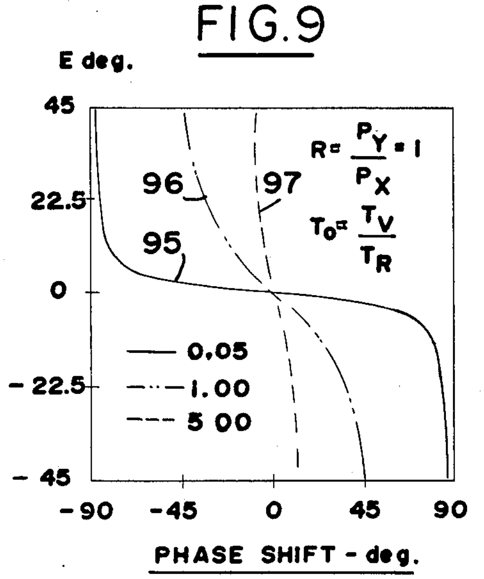
FIG. 9 is a graph showing the change in orientation of an object with change in phase difference, for objects of three different sphericity factors.

FIG. 7A illustrates the variation in required phase shift between acoustic energy in two perpendicular directions, required to achieve the critical angle, for various ratios R of acoustic pressures in the two perpendicular directions, for the same oval object for FIG. 7. A phase shift of at least about 45° is required to achieve the critical angle and begin continuous rotation of the object for R being close 1.As the ratio R progressively approaches 0.4 or its inverse of about 2.4, a progressively greater phase shift is required. The curves in FIGS. 7 and 7A are a function of the shape of the object, with the curves 92 and 102 being for an object with a "sphericity" factor $T_0$ of 1, which is an object similar to that of a football, with a largely oval shape having a length about 20% greater than its width. The term $T_0$ is a ratio of the magnitude of the viscous torque tending to rotate the object in accordance with the phase difference, divided by the magnitude of the airflow torque tending the maintain the object at its equilibrium position. An object which is almost spherical has a very low airflow torque resisting rotation, leading to a large sphericity factor $T_0$, and a small phase difference of only a few degrees can cause it to rotate continuously. An object in the form of a cylinder having a length twice its diameter has a large airflow torque resisting rotation, leading to a small sphericity factor $T_0$ of about 0.06 and requires a large phase difference of about 85° to rotate it past the critical angle. FIG. 9 contains curves 95, 96, and 97 showing the phase shift required to change the orientation E of an object away from its equilibrium orientation (which it occupies when the acoustic energies are in phase) for objects of different shapes, where R=1.

Where it is desired to change the orientation of an object, rather than to continuously rotate it, this can be accomplished by applying a phase difference less than that required to rotate the object past its critical angle. Thus, for an object with a sphericity ratio $T_0$ of 1, as indicated in the curve 96 of FIG. 9, and the two acoustic pressures equal, the object can be turned without continuously rotating it, by maintaining a phase shift of less than +45°. Below the critical angle, the greater the phase shift, the greater the angle E of rotation of the object from its equilibrium position. The ability to change the orientation of the object is useful as to enable viewing of a particular location on the object through a small window or to align the object with a laser or other instrument. Where the ratio R of acoustic energy in the two directions is about equal, it is only necessary to maintain the object within an angle less than 45° from its equilibrium position to assure that the object will not continue rotating.

Figure 10:
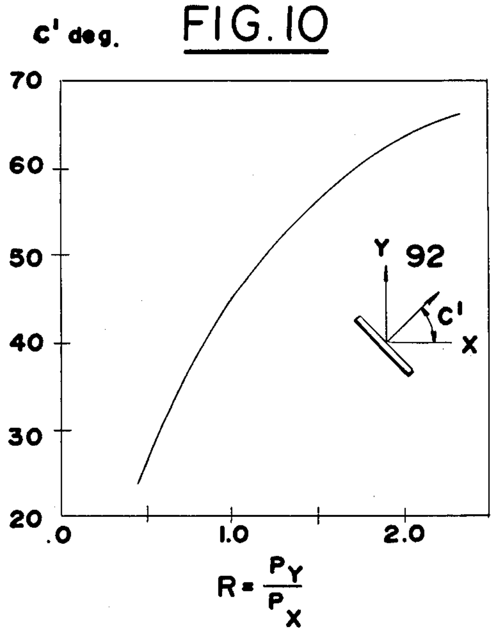
FIG. 10 is a graph showing the change in equilibrium angle with change in the ratio of acoustic pressures, for a zero phase difference.

A second method for changing the orientation of an object requires only the adjustment of the pressure ratio R, when the phase difference between the acoustic energies is zero. This method is independent of the shape of the object and thus independent of the sphericity factor $T_0$. The object is first oriented with equal acoustic pressures (R=1 and C'=45°). Reducing the pressure ratio R towards zero reorients the object clockwise towards the X axis (that is, C' approaches zero degrees). Increasing the pressure ratio toward infinity reorients the object counterclockwise towards the Y axis, that is, C' approaches 90°. Thus, the adjustment of the pressure ratio can reorient any levitated object up to +45° from its initial orientation (which is when R=1 and there is a zero phase difference). FIG. 10 shows the equilibrium angle for a practical range of pressure ratios. Of course, the ratio R and phase difference can be changed simultaneously.

It is possible to measure the sphericity of an object, by noting its reorientation angle E from an equilibrium position, for a given phase shift between the two acoustic waves. An almost spherical object will rotate almost 45° with a very small phase shift, while an object far from spherical will require a larger phase shift.

While it is generally desirable to apply the acoustic energy for rotational control of an object, at locations based about 90° apart about the chamber, a different spacing which is more than zero degrees and less than 180° will work, although with less efficiency.

As discussed earlier, an object can be both levitated and its rotation (rate of continuous rotation and/or rotational position) can be controlled using only two transducers. FIG. 3 illustrates an apparatus 110 wherein an object 112 lying within a parallelepiped chamber 114 of rectangular cross sections is both levitated and rotationally controlled by the output of two transducers 116, 118. The transducers are angled 90° about a vertical axis 120 of the chamber. The transducers are driven at the same frequency, at a rectangular mode of n21, where n is an integer of at least 2. The wavelength of the acoustic energy is given by the equation:

$$L_{n21} = \frac{2X}{[n^2 + 4(X/Y)^2 + (X/Z)^2]^{\frac{1}{2}}} (1 + 1.29\ Vs/Vc) \qquad \text{Eq. 2}$$

where n is an integer of at least 2; X, Y, and Z are the three dimensions of the chamber; and $V_s$ and $V_c$ are respectively the volume of the sample and the volume of the chamber, the equation being useful for $V_s$ up to about 20% of $V_s$.

FIG. 8 illustrates a system 120 using a pair of transducers 122, 124 for controlling the angular orientation of an object 126 lying within a chamber 128. The transducers can also be used to levitate the object by driving them at a single levitation mode. An oscillator 130 drives one of the transducers 124, and drives the other one 122 through a phase shifter 134. A control 136 can be adjusted on the phase shifter to enable a gradual change in phase to slowly turn the object to any orientation within a wide range (about ±45°).

Thus, the invention provides a method and apparatus for using acoustic energy to control rotation of an object. An object can be levitated and controlled in rotation by applying a single acoustic energy mode (a single resonant frequency or wavelength) by applying one of certain single levitation modes to a chamber at locations spaced about the chamber and with the acoustic energy at the two locations having a phase difference. Specific acoustic wavelengths are described for cylindrical chambers and chambers of rectangular cross section. A levitated object can be slowly rotated by applying a phase difference between the two acoustic waves, which is sufficient to rotate the object by more than its critical angle, followed by reduction of the phase difference to produce slow rotation. The object can be adjusted in angular orientation without continuously rotating it, by either applying a phase difference of less than its critical angle and/or by changing the pressure ratio between the two drivers. The sphericity of an object can be determined by its angle of turning away from an equilibrium position, for a given phase difference between the acoustic waves.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for establishing a levitated object in slow rotation comprising:

establishing an object in a chamber which has walls, away from the walls;

applying acoustic energy resonant to said chamber and of the same frequency at each of a pair of locations that are spaced about said chamber, including applying said acoustic energy at a first phase difference which causes said object to rotate by at least the critical angle, which would cause continuous object rotation, and then reducing the phase difference to keep the object rotating but at a lower average rotation rate than would result from maintaining the large phase difference.

2. The method described in claim 1 wherein:

said step of reducing is performed within two rotations of the object.

3. The method described in claim 1 wherein:

said step of applying acoustic energy includes applying acoustic energy of a frequency which levitates said object, whereby to levitate and slowly rotate an object with acoustic energy applied to only two locations.

4. A method for controlling the orientation of a nonspherical object which is levitated in a chamber comprising:

applying acoustic energy to said levitated object along two directions that are angled from each other, with the acoustic energy along the two directions being of the same frequency, including varying the ratio of acoustic pressure applied along the two directions to change the angular orientation of the object.

5. A method for measuring the degree of sphericity of an object which is levitated in a chamber comprising:

applying acoustic energy to said chamber at two locations spaced about the chamber, with the acoustic energy at the two locations being of the same frequency, including varying the phase difference between the energy of said locations and measuring the resultant change in angular orientation of the object.

6. A method for levitating and controlling rotation of an object in a substantially cylindrical chamber which has a cylindrical axis, comprising:

applying acoustic energy resonant to said chamber at each of a pair of locations that are spaced about said axis, with the acoustic energy at the two locations being of the same frequency but out of phase at least some of the time, and with the wavelength of said acoustic energy being given approximately by the equation $$L_{lon} = \frac{2a}{[0.344 + n^2(a/l)^2]^{\frac{1}{2}}}(1 + 1.29\, Vs/Vc)$$

where $L_{1on}$ is the wavelength of said acoustic energy, n is an integer of at least 2, a is the radius of the cylinder, l is the length of the cylinder, $V_s$ is the volume of the sample, $V_c$ is the volume of the chamber, and $V_s$ is no more than about 20% of $V_c$;

said step of applying includes applying said acoustic energies at pressures and a first phase difference which causes said object to turn to a position angled by more than a critical angle from an equilibrium position which said object assumes when there is zero phase difference and the acoustic pressures at said locations is equal, where said critical angle is the angle of rotation at which the object continues to rotate, and within about one second thereafter reducing the phase difference to a level which would cause said object to turn by less than said critical angle from said equilibrium position.

7. A method for levitating and controlling rotation of an object in a substantially cylindrical chamber which has a cylindrical axis, comprising:

establishing said object in a state wherein it is substantially devoid of rotation; and applying acoustic energy resonant to said chamber at each of a pair of locations that are spaced about said axis, with the acoustic energy at the two locations being of the same frequency but out of phase at least some of the time, and with the wavelength of said acoustic energy being given approximately by the equation $$L_{lon} = \frac{2a}{[0.344 + n^2(a/l)^2]^{\frac{1}{2}}}(1 + 1.29\, Vs/Vc)$$

where $L_{1on}$ is the wavelength of said acoustic energy, n is an integer of at least 2, a is the radius of the cylinder, l is the length of the cylinder, $V_s$ is the volume of the sample, $V_c$ is the volume of the chamber, and $V_s$ is no more than about 20% of $V_c$;

said step of applying includes establishing said acoustic energy at pressures and a phase difference which causes said object to turn by more than 1° but less than a critical angle at which the object would continue to rotate from an equilibrium position which the object assumes when there is a zero phase difference between the pair of acoustic waves, whereby to change the angular orientation of the object.

8. A method for levitating and controlling rotation of an object in a chamber of substantially rectangular cross section, comprising:

applying acoustic energy resonant to said chamber at each of a pair of locations that are spaced about said chamber, with the acoustic energy at the two locations being of the same frequency but out of phase at least some of the time, and with the wavelength of said acoustic energy being given approximately by the equation $$L_{n21} = \frac{2X}{[n^2 + 4(X/Y)^2 + (X/Z)^2]^{\frac{1}{2}}}(1 + 1.29\ Vs/Vc)$$

where $L_{n21}$ is the length of said acoustic energy, n is an integer of at least 2; X, Y, and Z are respectively the length, width, and height of the chamber; $V_s$ is the volume of the sample, $V_c$ is the volume of the chamber; and $V_s$ is no more than about 20% of $V_c$;

said step of applying includes applying said acoustic energies at pressures and a first phase difference which causes said object to turn to a position angled by at least about 45° from an equilibrium position which said object assumes when there is zero phase difference and the acoustic energy at said locations is equal, and within about one second thereafter reducing the phase difference to a level which would cause said object to turn by less than 45° from said equilibrium position.

9. A method for levitating and controlling rotation of an object in a chamber of substantially rectangular cross section, comprising:

establishing said object in a state wherein it is substantially devoid of rotation; and applying acoustic energy resonant to said chamber at each of a pair of locations that are spaced about said chamber, with the acoustic energy at the two locations being of the same frequency but out of phase at least some of the time, and with the wavelength of said acoustic energy being given approximately by the equation $$L_{n21} = \frac{2X}{[n^2 + 4(X/Y)^2 + (X/Z)^2]^{\frac{1}{2}}}(1 + 1.29\ Vs/Vc)$$

where $L_{n21}$ is the wavelength of said acoustic energy, n is an integer of at least 2; X, Y, and Z are respectively the length, width, and height of the chamber; $V_s$ is the volume of the sample, and $V_c$ is the volume of the chamber; and $V_s$ is no more than about 20% of $V_c$;

said step of applying includes establishing said acoustic energy at pressures and a phase difference which causes said object to turn by more than 1° but less than a critical angle at which the object would continue to rotate from an equilibrium position which the object assumes when there is a zero phase difference between the pair of acoustic waves, whereby to change the angular orientation of the object.

10. A method for controlling the orientation of a nonspherical object which is levitated in a chamber comprising:

applying acoustic energy to said chamber at two locations spaced about the chamber, with the acoustic energy at the two locations being of the same frequency, including varying the phase difference between the acoustic energy at the two locations to change the angular orientation of the object, but maintaining the phase difference so it is less than that which turns the object by the critical angle which would cause continuous object rotation.

* * * * *